United States Patent [19]
Yano et al.

[11] Patent Number: 5,471,802
[45] Date of Patent: Dec. 5, 1995

[54] ELECTROMAGNETICALLY SUSPENDED FLOATING FLOOR APPARATUS

[75] Inventors: Kenichi Yano, Tokyo; Yoichi Kanemitsu; Katsuhide Watanabe, both of Kanagawa, all of Japan

[73] Assignees: Ebara Corporation; Kajima Corporation, both of Tokyo, Japan

[21] Appl. No.: 111,438

[22] Filed: Aug. 25, 1993

[30] Foreign Application Priority Data

Aug. 26, 1992 [JP] Japan .................... 4-250598

[51] Int. Cl.$^6$ .............. F16F 15/03; E04F 15/00
[52] U.S. Cl. .............. 52/126.6; 52/6.5; 52/263; 52/167.1; 248/530; 248/638
[58] Field of Search ............ 52/1, 126.1, 126.5, 52/126.6, 263, 167 R; 248/550, 638, 581

[56] References Cited

U.S. PATENT DOCUMENTS

| | | |
|---|---|---|
| 3,464,657 | 9/1969 | Bullard . |
| 5,121,898 | 6/1992 | Yasuda et al. ............ 248/550 |
| 5,285,995 | 2/1994 | Gonzalez et al. ............ 248/550 |

FOREIGN PATENT DOCUMENTS

| | | |
|---|---|---|
| 0514877 | 11/1992 | European Pat. Off. . |
| 63275829 | 11/1988 | Japan . |
| 1250640 | 10/1989 | Japan . |
| 2-203040 | 8/1990 | Japan . |

OTHER PUBLICATIONS

Eisenhaure et al., "Magnetic Bearing for Precision Linear Slides", pp. 67–79.
Patent Abstracts of Japan, vol. 14, No. 495 (M–1041) Oct. 29, 1990.
Patent Abstracts of Japan, vol. 13, No. 593 (M–914)(3941) Dec. 27, 1989.
Patent Abstracts of Japan, vol. 13, No. 76 (M–800)(3424) Feb. 21, 1989.

*Primary Examiner*—Carl D. Freidman
*Assistant Examiner*—Robert J. Canfield
*Attorney, Agent, or Firm*—Wenderoth, Lind & Ponack

[57] ABSTRACT

An electromagnetically suspended floating floor apparatus in which a floating floor on which machines are set up is suspended from an installation floor with electromagnetic actuators so that the floating floor is spatially separated from the installation floor whereby no vibration is transmitted to equipment on the floating floor. The floating floor apparatus comprises the floating floor suspended from the installation floor at a plurality of supporting points by electromagnetic actuators, a light emitting member, fixed to a beam or a pillar, which emits a horizontal light beam, and a photosensor fixed to the installation floor which outputs a position signal representing a position of incidence of the horizontal light beam to the electromagnetic actuators. On the basis of the position signal, the electromagnetic actuators control a vertical position of the floating floor.

11 Claims, 5 Drawing Sheets

ELECTROMAGNETICALLY SUSPENDED FLOATING FLOOR APPARATUS

BACKGROUND OF THE INVENTION

1. Field of the Invention

The present invention relates to an electromagnetically suspended floating floor apparatus, and particularly to an electromagnetically suspended structure which is spatially separated from beams and pillars of a building by magnetically suspending the floor to avoid vibration thereof.

2. Related Arts

Equipment such as an electromicroscope and a semiconductor manufacturing apparatus, which must be isolated from vibrations are usually mounted on a vibration eliminating apparatus when installed in a factory. A vibration eliminating apparatus using a magnetic suspending system, which has an excellent vibration eliminating capability has been developed, replacing a conventional apparatus utilizing pneumatic springs or rubber, and details of such vibration eliminating apparatus are given, for example, in Japanese Patent Laid-open No. 203040/92.

FIG. 1 illustrates an example of a conventional vibration eliminating apparatus using a magnetic suspending system. Equipment such as an electromicroscope or a semiconductor manufacturing apparatus which must be isolated from vibration (not illustrated) is mounted on a vibration eliminating table 1, which is maintained in a suspended state by means of an electromagnetic actuator 2. Therefore, even if the installation floor (not shown) on which the electromagnetic actuator 2 is installe,d is caused to vibrate by an earthquake or the like, no vibration is transmitted to the suspended vibration eliminating table 1, and therefore equipment which is installed on the table is not affected by the vibration of the installation floor.

FIG. 2 is an explicative diagram of an electromagnetic actuator 2 of the vibration eliminating apparatus illustrated in FIG. 1. On the vibration eliminating table 1, on which a machine may be mounted, is fixed a yoke 3 consisting of a magnetic material. Electromagnets 4 are fixed to the installation floor 6 and suspend the magnetic yoke 3 that is fixed to the vibration eliminating table 1 with a magnetic attracting force. A gap between a pole of the electromagnet 4 and the magnetic yoke 3 to be suspended, as a target, can be measured with a displacement sensor 5. A controller 7 comprises a compensation circuit 9 and a power amplifier 10 used to control an excitation current provided to the electromagnet 4 so that the vibration eliminating table 1 and the magnetic yoke 3 can be stably suspended in a target position on the basis of the output from the displacement sensor 5.

Since the vibration eliminating apparatus explained above is provided for each piece equipment that is sensitive to vibration, any change to the configuration of the equipment within the installation room requires changing the arrangement of the vibration eliminating apparatus. Such a change may entail modifying the building housing the equipment. Moreover, in a semiconductor manufacturing factory, for example, a problem occurs in that it is difficult to make modifications to change the arrangement of the vibration eliminating apparatuses since such facilities are often replaced due to rapid technical innovation.

SUMMARY OF THE INVENTION

The present invention has been proposed to overcome the disadvantages of the prior art, and it is an object of the present invention to provide a floating floor apparatus on which sensitive equipment which must be isolated from any vibration can be freely arranged without any change in the arrangement of the vibration eliminating apparatus.

A floating floor apparatus of the present invention comprises a floating floor which is suspended from an installation floor with actuators provided at a plurality of supporting points, a light emitting means provided on a member associated with the installation floor to emit a light beam in a horizontal direction, and a photosensor means fixed to the floating floor to supply to the actuators a position signal representing a position of incidence of the light beam. The position signal causes the actuators to control a vertical position of the floating floor.

The floating floor is suspended by the actuators at the supporting points and is separated spatially from the installation floor. Therefore, no vibrations in the installation floor are transmitted to equipment mounted on the floating floor. In order to keep the whole part of the floating floor at a horizontal level, the photosensor means fixed to the floating floor receives a horizontal light beam and detects a vertical position of the floating floor with reference to the horizontal light beam so that the actuators can adjust a vertical position of the floating floor.

DESCRIPTION OF THE PREFERRED EMBODIMENTS

Figure 3:
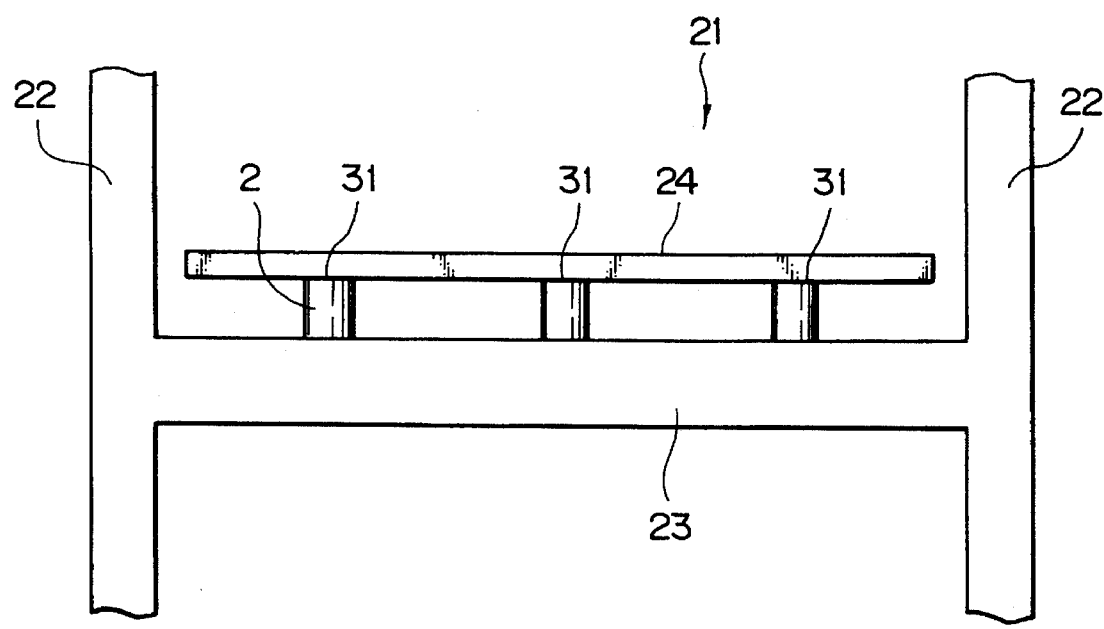
FIG. 3 is a sectional view schematically illustrating the structure of a preferred embodiment of an electromagnetically suspended floating floor apparatus to which the present invention is applied.

FIG. 3 illustrates a concept of a preferred embodiment of an electromagnetically suspended floating floor apparatus according to the present invention. An electromagnetically suspended floating floor 24 on which a plurality of machines such as electromicroscopes or semiconductor manufacturing apparatuses which must be isolated from vibration can be mounted is provided within a chamber 21 divided by pillars 22 and a beam 23. Such an electromagnetically suspended floating floor structure is suspended by electromagnetic actuators 2 at a plurality of supporting points 31, resulting in the floor structure being spatially separated from a building.

Figure 1:
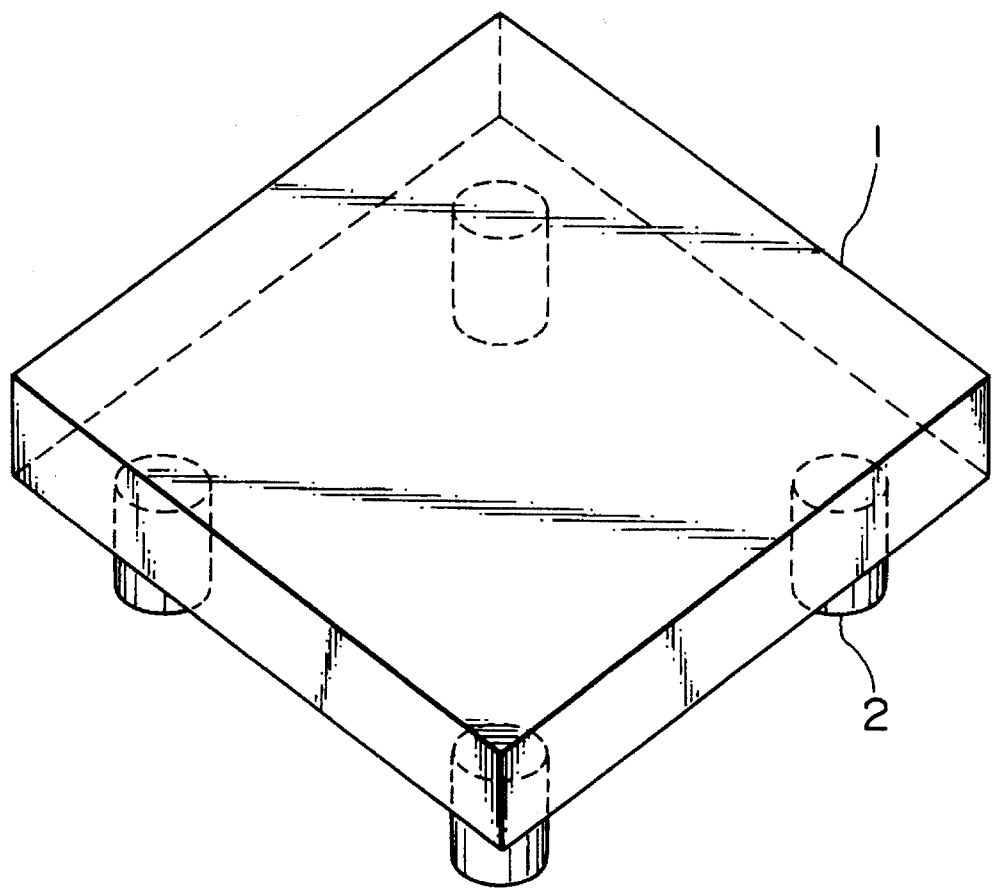
FIG. 1 is a perspective view schematically illustrating the structure of an existing vibration eliminating apparatus.
Figure 2:
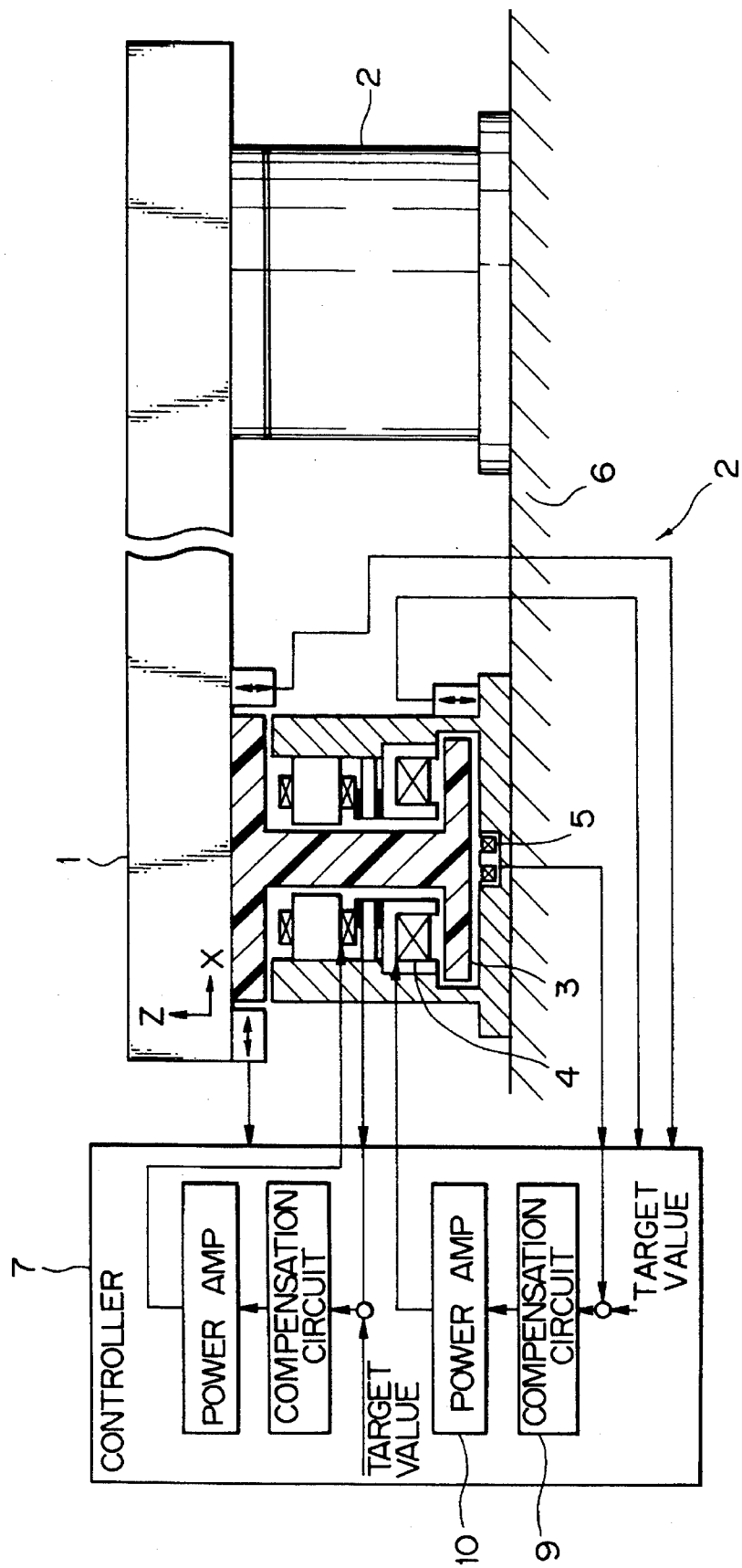
FIG. 2 shows a section of an existing electromagnetic actuator and a block diagram of a control unit for the actuator.
Figure 4:
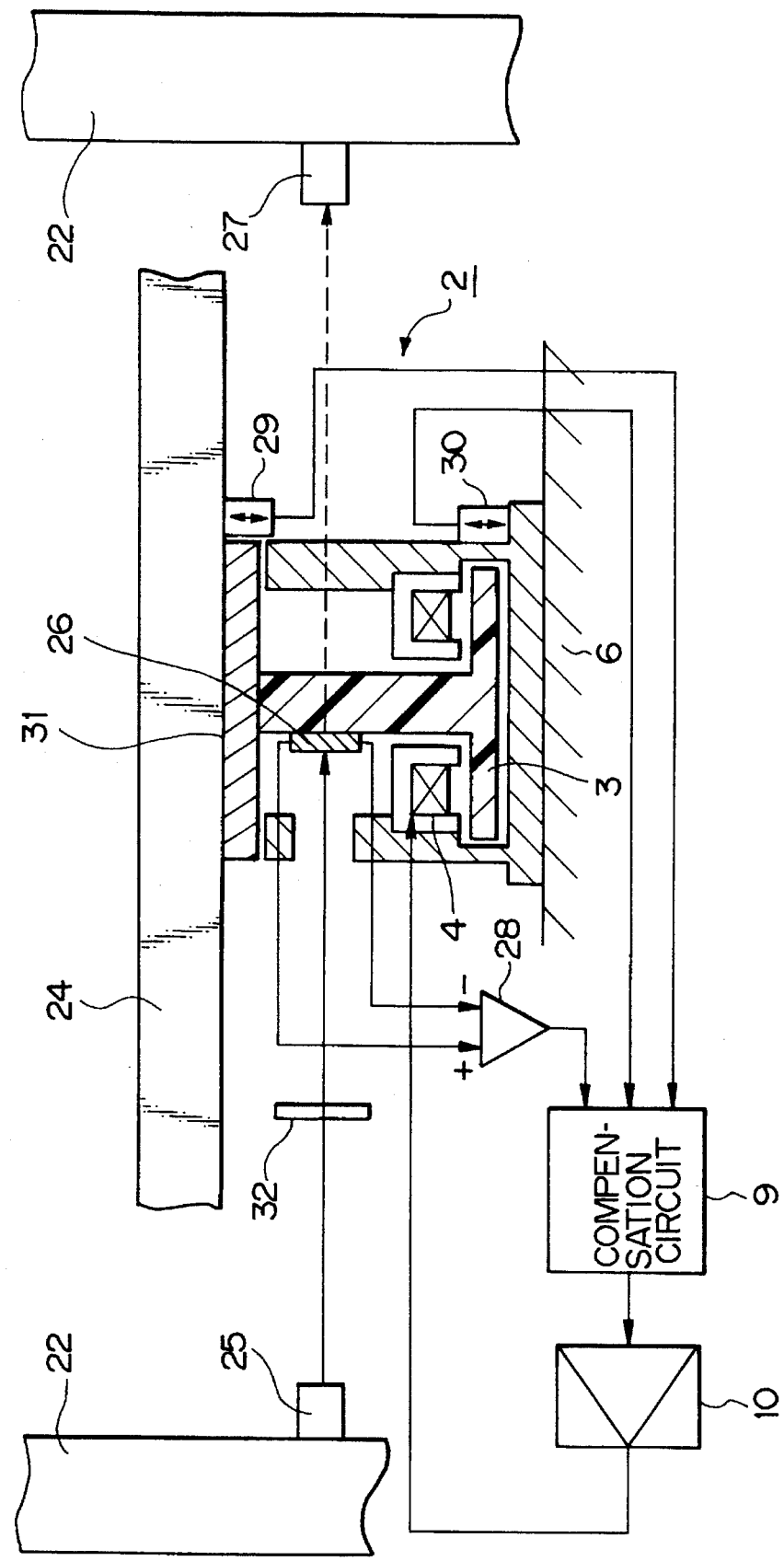
FIG. 4 shows a section of the electromagnetic actuator shown in FIG. 3 and a control unit for the actuator.

FIG. 4 is a diagram explaining details of a preferred embodiment of an electromagnetically suspended floating floor apparatus of the present invention. The structure of the electromagnetic actuator 2 supporting the floating floor 24 at one of the supporting points 31 is similar to that of the electromagnetically controlled actuator of the existing vibration eliminating apparatus shown in FIG. 2. Specifically, a magnetic yoke 3 is fixed to the floating floor 24 at the supporting point 31 and the magnetic yoke 3 is suspended by virtue of the magnetic attracting force of the electromagnet 4 fixed to the installation floor 6. One of the pillars 22 of the building adjacent to the actuator 2 is provided with a light emitting member 25, consisting of a laser light emitting element which can emit a light beam in the horizontal direction. A photosensor 26, which outputs a position signal representing a vertical position of the yoke 3 in accordance by a position irradiated with the light beam emitted from the light emitting member 25, is fixed to the magnetic yoke 3 suspended by the electromagnetic actuator 2. A position signal outputted from the photosensor 26 indicates a displacement of the yoke 3 from the horizontal light beam serving as a reference position of the floating floor 24 at the supporting point 31. Such a position signal is amplified by an amplifier 28 and then inputted to a compensation circuit 9. The amplified position signal undergoes phase and gain adjustment in the compensation circuit 9, is then amplified by a power amplifier 10 and changes an exciting current to the electromagnet 4. The position of the floating floor 24 can be adjusted to return to the reference position with a magnetic attracting force generated by the electromagnet 4 depending on a level of exciting current applied thereto. The pillar opposite to the light emitting member 25 is provided with a light receiving element 27 to confirm if the light beam emitted from the light emitting member 25 is in the horizontal direction.

The electromagnetic actuator 2 which suspends the floating floor 24 at each supporting point 31 operates as explained hereunder. Since the electromagnet 4 suspends the magnetic yoke 3 with a magnetic attracting force, the floating floor 24 is suspended by the electromagnetic actuator 2 at the supporting point 31 and is spatially separated from the building. For example, if a position of a part of the installation floor 6 is changed in a vertical direction, the position where the horizontal light beam from the light emitting member 25 impinges the photosensor 26 also changes. As a result, the photosensor 26 outputs a voltage corresponding to the position at which the light beam is incident. The exciting current fed to the electromagnet 4 is controlled through the compensation circuit 9 and the power amplifier 10 based on an output voltage of the photosensor 26, namely, a position signal which indicates a detected displacement of the yoke 3 in the vertical direction, thereby forcing the magnetic yoke 3, namely the floating floor 24, to move up or move down to the reference position at the supporting point 31. Therefore, even if a relative position of the floating floor 24 changes due to a positional change in the installation floor 6 or for other reasons, the floating floor 24 is controlled to return to the reference position, maintaining the entire floating floor in a horizontal position.

The floating floor 24 is also provided with a first acceleration sensor 29, while the installation floor 6 is provided with a second acceleration sensor 30. Signals detected by these acceleration sensors 29 and 30 are inputted to the compensation circuit 9 to generate a compensation signal, which is in turn power-amplified by the power amplifier 10, and then applied to the electromagnet 4 as a portion of the exciting current. The compensation circuit 9 operates to control the floating floor 24 to damp (attenuate) vibration thereof in accordance with acceleration detected by the acceleration sensors 29 and 30.

Specifically, if any external force is applied to the supporting point 31 where the electromagnetic actuator 2 suspends the floating floor 24, the first acceleration sensor 29 detects acceleration caused by the external force and the compensation circuit 9 and the power amplifier 10 cause the electromagnet 4 to generate a magnetic attracting force whereby the external force applied to the floating floor 24 is cancelled and the floating floor 21 is maintained at the predetermined reference position. Similarly, if an external force is applied to the installation floor 6, acceleration caused by the external force applied to the installation floor 6 is detected by the second acceleration sensor 30. The output of the second acceleration sensor 30 is fed back to the electromagnet 4 as the exciting current through the compensation circuit 9 and the power amplifier 10. Accordingly, the floating floor 24 is controlled to quickly attenuate the vibration.

Figure 5:
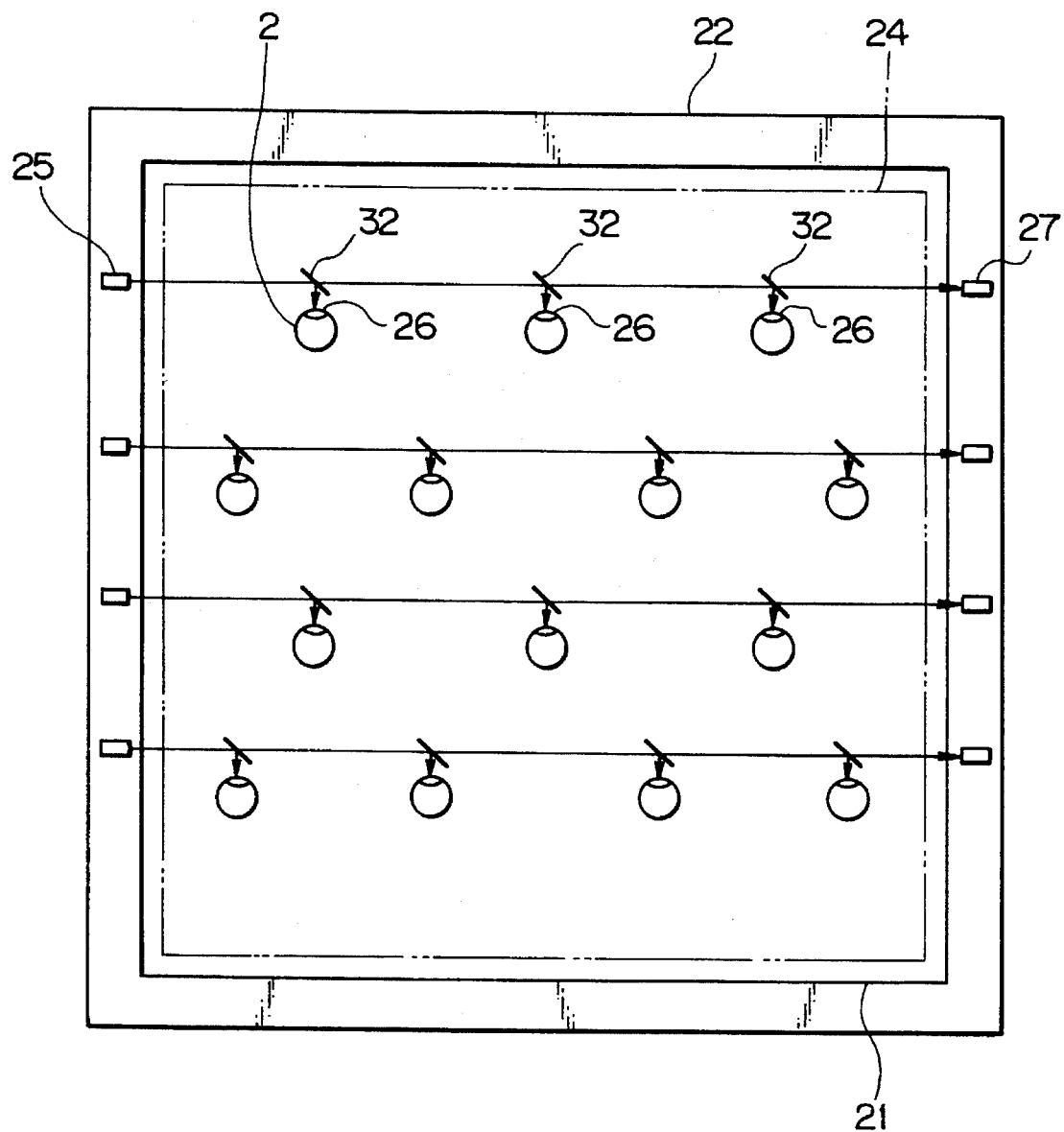
FIG. 5 is a diagram indicating a positional relationship between a light emitting member and a photosensor in the electromagnetic floating floor shown in FIG. 3.

FIG. 5 is a plan view of a preferred embodiment of an electromagnetically suspended floating floor apparatus to which the present invention is applied. A multiplicity of electromagnetic actuators 2 are arranged in the chamber 21 and the floating floor 24 is suspended at the supporting points by the electromagnetic actuators 2. The pillar 22 of the chamber is provided with the light emitting members 25, which emit horizontal light beams propagating through the chamber 21. Half-mirrors 32 are respectively provided in the vicinity of the supporting points of the floating floor 24 suspended by the electromagnetic actuators 2. Accordingly, the light beam emitted from each light emitting member 25 irradiates a corresponding half-mirror 32 and a part of the light beam is reflected thereby and received by the photosensor 26 of a corresponding electromagnetic actuator 2. Such being the case, horizontal light beams indicating a reference position are incident on the actuators 2 which suspend the floating floor 24 and positions of respective points on the floating floor 24 are detected relative to the reference position.

As described heretofore, an electromagnetically suspended floating floor apparatus of the present invention maintains the floating floor 24 in a horizontal position with reference to horizontal light beams by controlling the electromagnetic actuators. Therefore, the floating floor 24 is kept without fail in a horizontal position and is spatially separated from beams and pillars of a building, whereby no vibration of the building is transmitted to the floor 24. Vibration generated at any part of the floating floor can be quickly attenuated by a control system. Accordingly, equipment to which no vibration is to be transmitted can be arranged freely on the floating floor, and rearrangement of such equipment may be conducted easily.

What is claimed is:

1. A floating floor apparatus, comprising:

an installation floor;

a floating floor suspended above said installation floor at a plurality of supporting points on said floating floor;

a plurality of electromagnetic actuators on said installation floor supporting said floating floor in a suspended state above said installation floor at respective said supporting points;

a control means for supplying a control signal to each said electromagnetic actuator for controlling the vertical position of said floating floor;

a light emitting means mounted at a position fixed relative to said installation floor for emitting a horizontal light beam; and a photosensing means fixed relative to said floating floor for supplying a vertical position signal representing a position of incidence of the horizontal light beam thereon to said control means.

2. The floating floor apparatus of claim 1, and further comprising a half mirror positioned so as to direct the horizontal light beam from said light emitting means to said photosensing means.

3. The floating floor apparatus of claim 2, wherein said photosensing means comprises a photosensor fixed relative to said floating floor at each respective said support point, and further comprising a plurality of half mirrors located at respective said support points along the horizontal light beam so as to direct the horizontal light beam to respective said photosensors.

4. The floating floor of claim 1, and further comprising acceleration sensors fixed relative to said floating floor and said installation floor at said support points providing output signals to said control means for control of the respective said electromagnetic actuators.

5. The floating floor apparatus of claim 1, wherein each of said electromagnetic actuators comprises a magnetic yoke fixed to and supporting said floating floor at a respective said support point and electromagnets fixed relative to said installation floor suspending said magnetic yoke, and wherein said photosensing means is fixed on said magnetic yoke.

6. The floating floor apparatus of claim 5, wherein said photosensing means comprises a photosensor on each said magnetic yoke.

7. The floating floor apparatus of claim 6, and further comprising a half mirror positioned so as to direct the horizontal light beam from said light emitting means to said photosensor.

8. The floating floor apparatus of claim 7, and further comprising a plurality of half mirrors located at respective said support points along the horizontal light beam so as to direct the horizontal light beam to respective said photosensors on respective said magnetic yokes.

9. The floating floor apparatus of claim 6, wherein said control means comprises a plurality of control apparatus that each comprises an amplifier connected to one said photosensor, a compensation circuit receiving the output of said amplifier and a power amplifier receiving the output of said compensation circuit, said power amplifier being connected to said electromagnets.

10. The floating floor apparatus of claim 9, wherein each of said electromagnetic actuators has one said control apparatus connected therewith.

11. The floating floor apparatus of claim 10, and further comprising acceleration sensors fixed relative to said floating floor and said installation floor at one said support point providing an output signal to one said compensation circuit of one said control apparatus for control of one said electromagnetic actuator.

\* \* \* \* \*